United States Patent
Pan et al.

(10) Patent No.: US 9,324,346 B1
(45) Date of Patent: Apr. 26, 2016

(54) HEAD STACK ASSEMBLY WITH A FLEXIBLE PRINTED CIRCUIT HAVING A MOUTH CENTERED BETWEEN ARMS

(75) Inventors: Tzong-Shii Pan, San Jose, CA (US); Shufun Ho, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 2380 days.

(21) Appl. No.: 12/195,288

(22) Filed: Aug. 20, 2008

(51) Int. Cl.
*G11B 5/55* (2006.01)
*G11B 21/08* (2006.01)
*G11B 5/48* (2006.01)

(52) U.S. Cl.
CPC ...................................... *G11B 5/486* (2013.01)

(58) Field of Classification Search
USPC ....................................................... 360/264.2
See application file for complete search history.

(56) References Cited

U.S. PATENT DOCUMENTS

| | | | |
|---|---|---|---|
| 5,422,764 A | 6/1995 | McIlvanie | |
| 5,668,684 A | 9/1997 | Palmer et al. | |
| 5,872,687 A * | 2/1999 | Arya et al. | 360/264.2 |
| 5,903,413 A | 5/1999 | Brooks, Jr. et al. | |
| 6,134,770 A | 10/2000 | Heeren et al. | |
| 6,145,188 A | 11/2000 | Brooks, Jr. et al. | |
| 6,185,075 B1 | 2/2001 | Tsujino et al. | |
| 6,212,046 B1 | 4/2001 | Albrecht et al. | |
| 6,360,426 B1 | 3/2002 | Summers et al. | |
| 6,399,889 B1 | 6/2002 | Korkowski et al. | |
| 6,634,086 B2 | 10/2003 | Korkowski et al. | |
| 7,110,222 B2 | 9/2006 | Erpelding | |
| 2007/0153427 A1 | 7/2007 | Izumi et al. | |
| 2007/0279807 A1 | 12/2007 | Kobayashi et al. | |
| 2008/0225439 A1* | 9/2008 | Komura | 360/264.2 |

* cited by examiner

*Primary Examiner* — Gustavo Polo

(57) ABSTRACT

A novel head stack assembly (HSA) is disclosed and claimed. The HSA includes a flexible printed circuit (FPC) having a mouth with an upper mouth edge and a lower mouth edge. The FPC includes a first plurality of conductive terminals immediately adjacent the upper mouth edge and a second plurality of conductive terminals immediately adjacent the lower mouth edge. The mouth defines and is bisected by a mouth centerline disposed equidistant from the upper mouth edge and the lower mouth edge. The mouth centerline is substantially parallel to and substantially equidistant from first and second actuator arms of the HSA. A first plurality of conductive traces of a first head gimbal assembly (HGA) is electrically connected to the first plurality of conductive terminals, and a second plurality of conductive traces of a second HGA is electrically connected to the second plurality of conductive terminals.

5 Claims, 5 Drawing Sheets

US 9,324,346 B1

HEAD STACK ASSEMBLY WITH A FLEXIBLE PRINTED CIRCUIT HAVING A MOUTH CENTERED BETWEEN ARMS

BACKGROUND OF THE INVENTION

1. Field of the Invention

The present invention relates generally to the field of information storage devices, and more particularly to head stack assemblies used in such devices.

2. Background of the Art

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head-gimbal assembly (HGA) that typically includes a laminated flexure to carry the electrical signals to and from the head. The HGA, in turn, is a sub-component of a head-stack assembly (HSA) that typically includes a plurality of HGAs, an actuator, and a flexible printed circuit (FPC). The plurality of HGAs are attached to various arms of the actuator, and each of the laminated flexures of the HGAs has a flexure tail that is electrically connected to the FPC.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the FPC adjacent the actuator body. That is, the flexure includes traces that extend from adjacent the head and continue along the flexure tail to electrical connection points. The FPC includes conductive electrical terminals that correspond to the electrical connection points of the flexure tail.

To facilitate electrical connection of the conductive traces of the flexure tails to the conductive electrical terminals of the FPC during the HSA manufacturing process, the flexure tails must first be properly positioned relative to the FPC so that the conductive traces of the flexure tails are aligned with the conductive electrical terminals of the FPC. Then the flexure tails must be held or constrained to maintain proper alignment while the aforementioned electrical connections are made. Practically obtaining and maintaining such proper relative alignment in a high-volume manufacturing environment is a non-trivial challenge for manufacturers that require fast, cost-effective, and robust manufacturing processes to survive in a highly competitive industry.

Accordingly, there is a need in the art for improved HSA designs, to facilitate relative positioning and electrical connection of the conductive traces of a flexure tail to the conductive electrical terminals of an FPC during HSA manufacture.

SUMMARY

A novel head stack assembly (HSA) is disclosed and claimed. The HSA includes a first head gimbal assembly (HGA) attached to a first actuator arm, and a second HGA attached to a second actuator arm. The first HGA includes a first flexure tail having a first plurality of conductive traces, and the second HGA includes a second flexure tail having a second plurality of conductive traces. A flexible printed circuit (FPC) has a mouth with an upper mouth edge and a lower mouth edge. The FPC includes a first plurality of conductive terminals immediately adjacent the upper mouth edge and a second plurality of conductive terminals immediately adjacent the lower mouth edge. The mouth defines and is bisected by a mouth centerline disposed equidistant from the upper mouth edge and the lower mouth edge. The mouth centerline is substantially parallel to and substantially equidistant from the first and second actuator arms. The first plurality of conductive traces is electrically connected to the first plurality of conductive terminals, and the second plurality of conductive traces is electrically connected to the second plurality of conductive terminals.

DETAILED DESCRIPTION OF EXEMPLARY EMBODIMENTS

Figure 1:
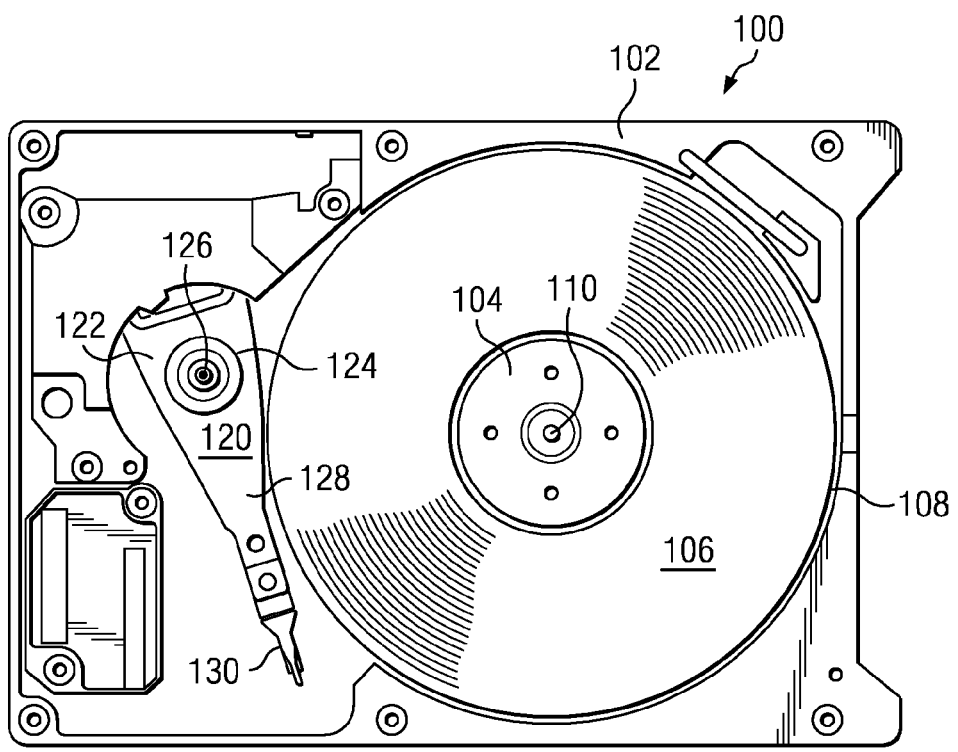
FIG. 1 is top view of a disk drive capable of incorporating an embodiment of the present invention.

FIG. 1 is top view of a disk drive 100 capable of incorporating an embodiment of the present invention. The disk drive 100 includes a disk drive base 102, a spindle 104 attached to the disk drive base 102, and at least one annular magnetic disk 106 attached to the spindle 104. The spindle motor 104 rotates the disk 106 about a spindle axis of rotation 110 (oriented in & out of the page in FIG. 1). The disk 106 contains a plurality of magnetic tracks for storing data, disposed upon opposing first and second disk surfaces of the disk 106. The disk 106 includes a disk outer edge 108 (corresponding to the outer diameter of disk 106).

The disk drive 100 further includes a head stack assembly (HSA) 120 rotatably attached to the base 102. The HSA 120 includes an actuator body 122 having a bore and a pivot bearing cartridge 124 engaged within the bore for enabling the HSA 120 to rotate relative to the base 102 about actuator pivot axis 126. The actuator pivot axis 126 (oriented in & out of the page in FIG. 1) is substantially parallel to the spindle axis of rotation 110. One or more actuator arms 128 extend from the actuator body 122, and one or two head gimbal assemblies (HGA) 130 are attached to a distal end of each actuator arm 128.

Figure 2:
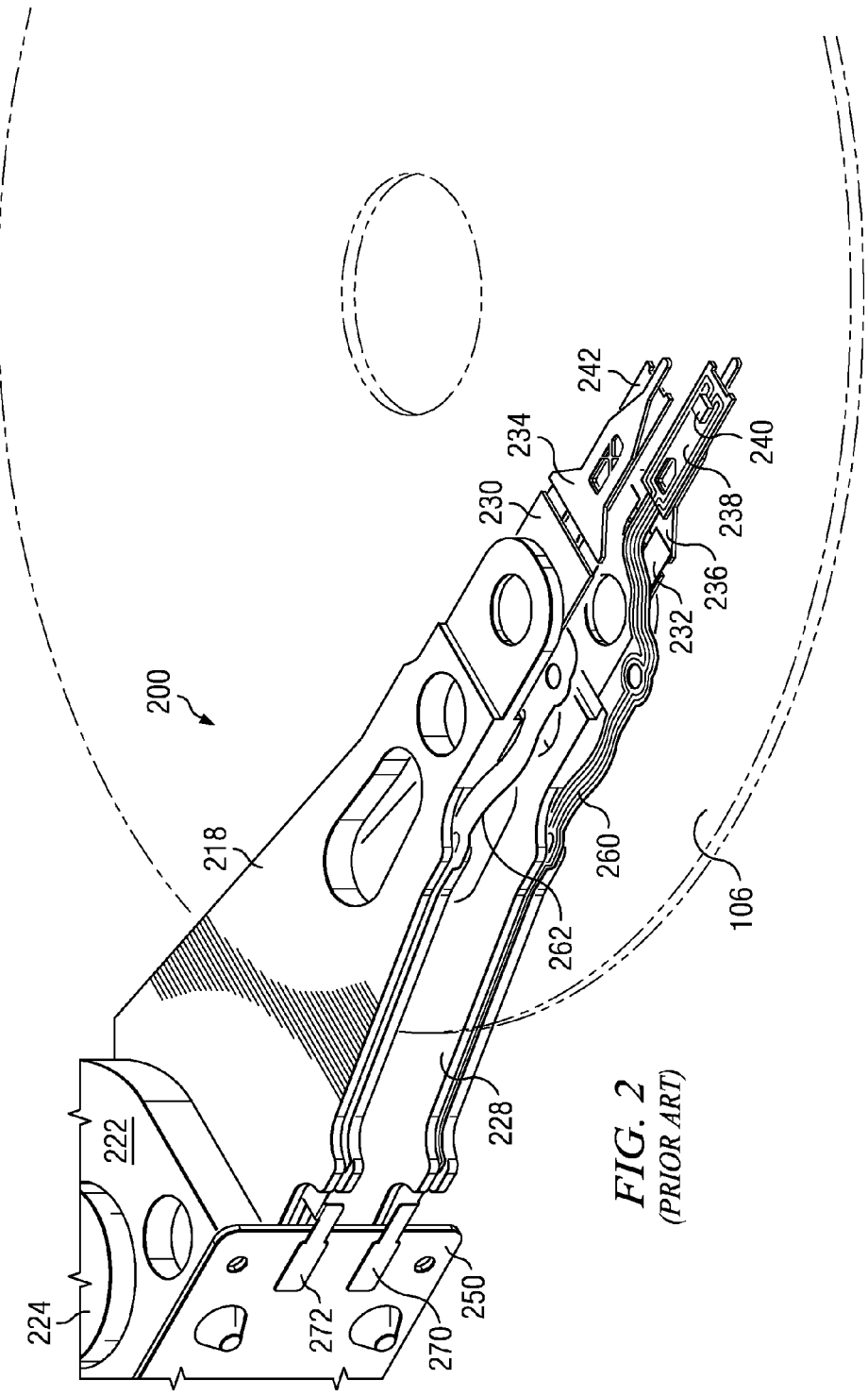
FIG. 2 is a perspective view of a head stack assembly according to the prior art.

Now referring to FIG. 2, a perspective view of a head stack assembly (HSA) 200 according to the prior art is shown. The head stack assembly 200 is electrically connected to disk drive channel and driver circuitry via a conventional flexible printed circuit (FPC) 250. The HSA 200 includes an actuator body 222 having a bore and a pivot bearing cartridge 224 engaged within the bore. Two actuator arms 218 and 228 extend from the actuator body 222. Head gimbal assembly (HGA) 230 is attached to the distal end of actuator arm 218, and HGA 232 is attached to the distal end of actuator arm 228. Each of HGAs 230 and 232 includes a head (e.g. head 240) for reading and writing data from and to a disk (e.g. disk 106). In magnetic hard disk drive applications, the head 240 comprises a body called a "slider" that carries a magnetic transducer on its trailing end (not visible given the scale of FIG. 2). The magnetic transducer may include an inductive write element and a magnetoresistive read element and during disk drive operation will be separated from the magnetic disk by a very thin hydrodynamic air bearing. The thickness of the air bearing at the location of the transducer is commonly referred to as "flying height."

Still referring to FIG. 2, HGA 230 includes a load beam 234 and HGA 232 includes a load beam 236. Each of HGAs 230 and 232 also includes a laminated flexure. For example, HGA 232 includes a laminated flexure 238 attached to the load beam 236, with the head 240 attached to the laminated flexure 238. The purpose of the load beam 236 is to provide vertical compliance for the head 240 to follow vertical undulation of the surface of an adjacent disk as it rotates, and to preload the head 240 against the adjacent surface of that disk by a preload force that is commonly referred to as the "gram load." A first purpose of the flexure 238 is to provide compliance for the head 240 to follow pitch and roll angular undulations of the surface of the disk as it rotates, while restricting relative motion between the head 240 and the load beam 236 in the lateral direction and about a yaw axis. A second purpose of the flexure 238 is to provide a plurality of electrical paths from the head 240 to the FPC 250 to facilitate signal transmission to/from the head 240.

For that second purpose, the flexure 238 includes a flexure tail 260 that extends away from the head 240 along the actuator arm 228 and ultimately attaches to the FPC 250 adjacent the actuator body 222. That is, the flexure 238 includes traces that extend from adjacent the head 240 to electrical connection points in a terminal region 270 of the flexure tail 260. Likewise, HGA 230 includes a flexure 242 that includes a flexure tail 262 that attaches to FPC 250 in a terminal region 272. As can be seen in FIG. 2, each flexure tail (e.g. flexure tail 260) is a distinct and smaller component, as compared with the FPC 250. The traces on the flexure tail 260 are electrically connected to the FPC 250, at terminal region 270 of the flexure tail 260. Methods of electrical connection of the flexure tail 260 to the FPC 250 include ultrasonic tab bonding, solder reflow, and solder jet bond (SJB).

Figure 3:
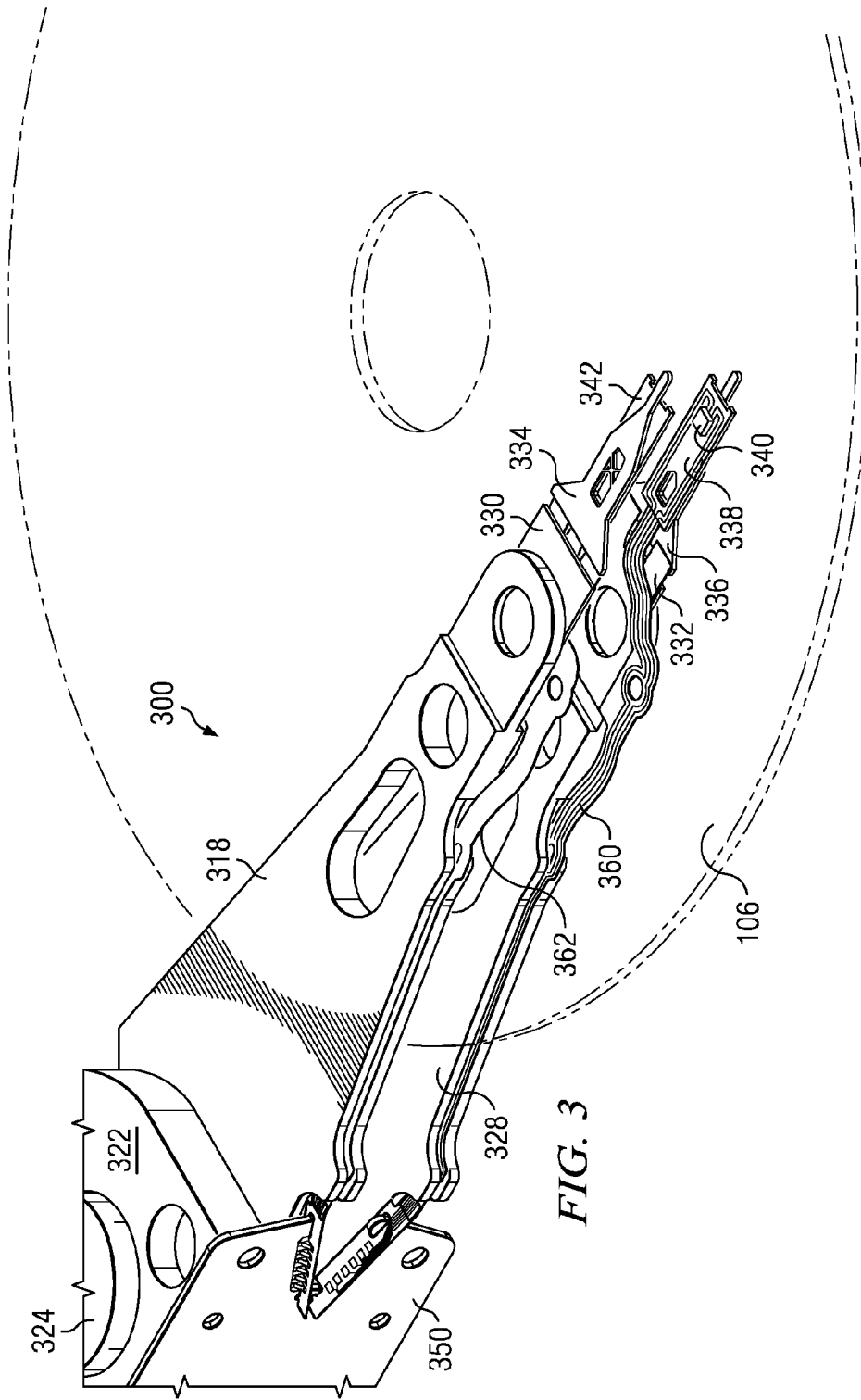
FIG. 3 is a perspective view of a head stack assembly according to an embodiment of the present invention.

Now referring to the embodiment of FIG. 3, a perspective view of a head stack assembly 300 according to an embodiment of the present invention is shown. The head stack assembly 300 is electrically connected to disk drive channel and driver circuitry via novel flexible printed circuit (FPC) 350. The HSA 300 includes an actuator body 322 having a bore and a pivot bearing cartridge 324 engaged within the bore. Two actuator arms 318 and 328 extend from the actuator body 322, but in other embodiments the HSA 300 may include a different number of actuator arms (e.g. four). Head gimbal assembly (HGA) 330 is attached to the distal end of actuator arm 318, and HGA 332 is attached to the distal end of actuator arm 328. Each of HGAs 330 and 332 includes a head (e.g. head 340) for reading and writing data from and to a disk (e.g. disk 106).

Still referring to the embodiment of FIG. 3, HGA 330 includes a load beam 334 and HGA 332 includes a load beam 336. Each of HGAs 330 and 332 also includes a laminated flexure. For example, HGA 332 includes a laminated flexure 338 attached to the load beam 336, with the head 340 attached to the laminated flexure 338. A first purpose of the flexure 338 is to provide compliance for the head 340 to follow pitch and roll angular undulations of the surface of the disk as it rotates, while restricting relative motion between the head 340 and the load beam 336 in the lateral direction and about a yaw axis. A second purpose of the flexure 338 is to provide a plurality of electrical paths from the head 340 to the FPC 350 to facilitate signal transmission to/from the head 340.

For that second purpose, the flexure 338 of the embodiment of FIG. 3 includes a flexure tail 360 that extends away from the head 340 along the actuator arm 328 and ultimately attaches to the FPC 350 adjacent the actuator body 322. Likewise, HGA 330 includes a flexure 342 that includes a flexure tail 362 that attaches to FPC 350. As can be seen in FIG. 3, each flexure tail (e.g. flexure tail 360) is a distinct and smaller component, as compared with the FPC 350. Each of the laminated flexures 338, 342 includes a plurality of electrically conductive traces that are isolated from a structural layer by a dielectric layer. For example, the conductive traces may comprise copper, the structural layer may comprise stainless steel, and the dielectric layer may comprise polyimide. Portions of the electrically conductive traces may also be coated with an insulative cover layer (e.g. a polymer layer).

Figure 4:
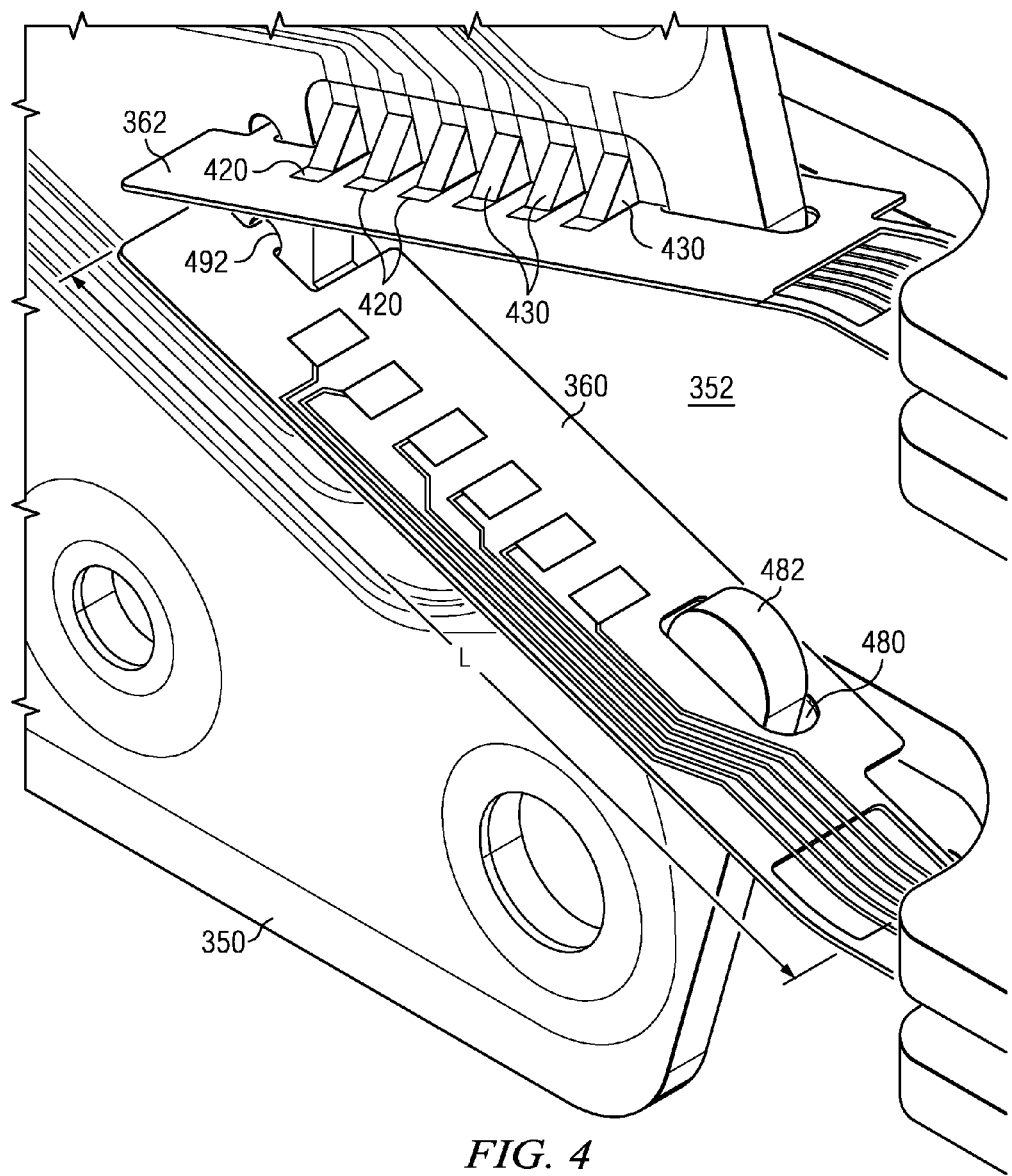
FIG. 4 depicts a close up perspective view of a portion of a head stack assembly according to an embodiment of the present invention.
Figure 5:
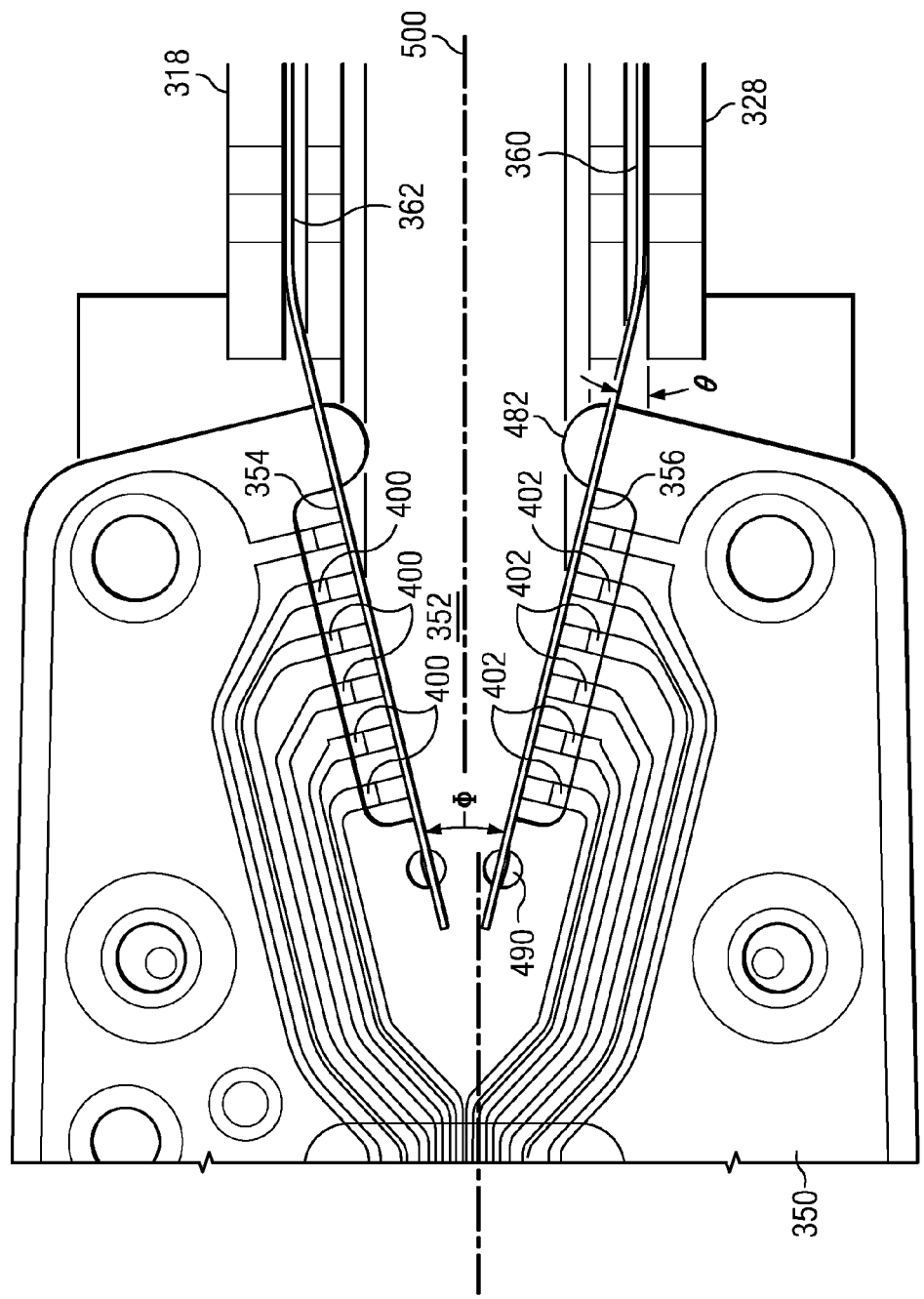
FIG. 5 depicts a close up side view of a portion of a head stack assembly according to an embodiment of the present invention.

FIG. 4 depicts a close up perspective view of a portion of a head stack assembly according to an embodiment of the present invention, and FIG. 5 depicts a close up side view of a portion of the head stack assembly of FIG. 4. In the embodiment of FIGS. 4 and 5, FPC 350 has a mouth 352 including an upper mouth edge 354 and a lower mouth edge 356. The FPC 350 includes a first plurality of conductive terminals 400 immediately adjacent the upper mouth edge 354 and a second plurality of conductive terminals 402 immediately adjacent the lower mouth edge 356. What is meant by "immediately" adjacent is that the terminals are close enough to the mouth edge to enable a 90-degree electrical bond/connection to be made between each terminal and a corresponding conductive trace of the corresponding flexure tail. Note that as used herein, not just any portion of a conductor may be considered as a "terminal"; rather, a terminal is considered to the terminus of a conductor of the FPC (i.e. where the conductor terminates and where an electrical connection to that conductor of the FPC is made). The mouth 352 defines and is bisected by a mouth centerline 500 disposed equidistant from the upper mouth edge 354 and the lower mouth edge 356. The mouth centerline 500 is substantially parallel to and substantially equidistant from the first and second actuator arms 318 and 328.

This positioning of the mouth centerline 500 may enable increased vertical deflection of the flexure tails, which may provide increased vertical preload during electrical connection (e.g. more reliable physical contact of solder bumps on mating parts during a solder reflow process). For example in the embodiment of FIG. 5, the flexure tail 362 includes a bend that defines an angular change θ, and preferably θ is in the range 6-20 degrees. Likewise, the flexure tail 360 includes a bend that defines an angular change θ that is preferably in the range 6-20 degrees. Also, in the embodiment of FIG. 5, the upper mouth edge 354 and the lower mouth edge 356 are at an angle φ relative to each other. It can be seen that, optionally but not necessarily in the embodiment of FIG. 5, φ=28. Preferably φ is in the range 12-40 degrees. In the embodiment of FIG. 4, the flexure tail 360 has an unsupported portion having a length L. Preferably, L is greater than 4 mm. The bends in the flexure tails and the relative angles of the mouth edges may serve to adequately preload the flexure tails against the upper and lower mouth edges, facilitating reliable contact between mating parts during the electrical connection process.

However, this positioning of the mouth 352, in a position that is substantially equidistant from the first and second actuator arms 318 and 328, stands in contradiction to conventional wisdom, which would instead lead to an alignment of the center of the mouth with either the first or second actuator arm to facilitate electrical interconnection (because the sides of the flexure tails that have conductive traces would then face towards, rather than away from, the FPC 350).

The consequences of this contradiction with conventional wisdom may be at least partially mitigated in the embodiment of FIG. 4 by specified openings in the flexure tails. Specifically, in the embodiment of FIG. 4, the plurality of conductive traces of flexure tail 362 are electrically connected to the first plurality of conductive terminals 400 via a first plurality of openings 420 in the structural layer and the dielectric layer of flexure tail 362. For example, the plurality of conductive traces of flexure tail 362 may be electrically connected to the first plurality of conductive terminals 400 via solder connections 430 through openings 420 in the structural layer and the dielectric layer of flexure tail 362. Likewise, the plurality of conductive traces of flexure tail 360 may be electrically connected to the second plurality of conductive terminals 402 via a second plurality of openings (not visible in FIG. 4) in the structural layer and the dielectric layer of flexure tail 360. These openings in the structural and dielectric layers of the flexure tails enable the mouth 352 to be positioned and aligned against conventional wisdom as described previously.

In the embodiment of FIGS. 4 and 5, the flexure tail 360 includes a slot 480, and tab 482 protrudes from the lower mouth edge 356 into the slot 480. Also in the embodiment of FIGS. 4 and 5, the FPC 350 includes a hole 490 and the flexure tail 360 includes a tab 492 that protrudes from the flexure tail 360 into the hole 490. These tabs, slots, and holes, shown in FIGS. 4 and 5, may serve to position the flexure tails relative to the upper and lower mouth edges, facilitating assembly.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. "Comprising," "including," and "having," are intended to be open-ended terms.

What is claimed is:

1. A disk drive comprising:
a disk drive base;
a spindle attached to the disk drive base;
a disk attached to the spindle;
a head stack assembly (HSA) rotably attached to the disk drive base, the HSA including;
first and second actuator arms, a portion of the first actuator arm being parallel to a corresponding portion of the second actuator arm;
a first head gimbal assembly (HGA) attached to the first actuator arm, the first HGA including a first flexure tail having a first plurality of conductive traces;
a second HGA attached to the second actuator arm, the second HGA including a second flexure tail having a second plurality of conductive traces, each of the first and second HGAs including a head that faces and is adjacent the disk; and
a flexible printed circuit (FPC) having a mouth, the mouth including an upper mouth edge and a lower mouth edge, the FPC including a first plurality of conductive terminals immediately adjacent the upper mouth edge and a second plurality of conductive terminals immediately adjacent the lower mouth edge, the mouth defining and being bisected by a mouth centerline disposed equidistant from the upper mouth edge and the lower mouth edge, the mouth centerline being spaced from and substantially parallel to and substantially equidistant from the portion of the first actuator arm and the corresponding portion of the second actuator arms, the mouth centerline aligned with the disk;
wherein the first plurality of conductive traces is electrically connected to the first plurality of conductive terminals, and the second plurality of conductive traces is electrically connected to the second plurality of conductive terminals.

2. The disk drive of claim 1, wherein the disk has opposing first and second disk surfaces, and the mouth centerline is aligned with the disk between the first and second disk surfaces.

3. The disk drive of claim 1 wherein the upper mouth edge and the lower mouth edge are at an angle relative to each other in the range 12-40 degrees.

4. The disk drive of claim 1 wherein the first flexure tail includes a bend that defines an angular change in the range 6-20 degrees.

5. The disk drive of claim 1 wherein the second flexure tail has an unsupported portion having a length greater than 4 mm.

\* \* \* \* \*